United States Patent Office 2,843,359
Patented July 15, 1958

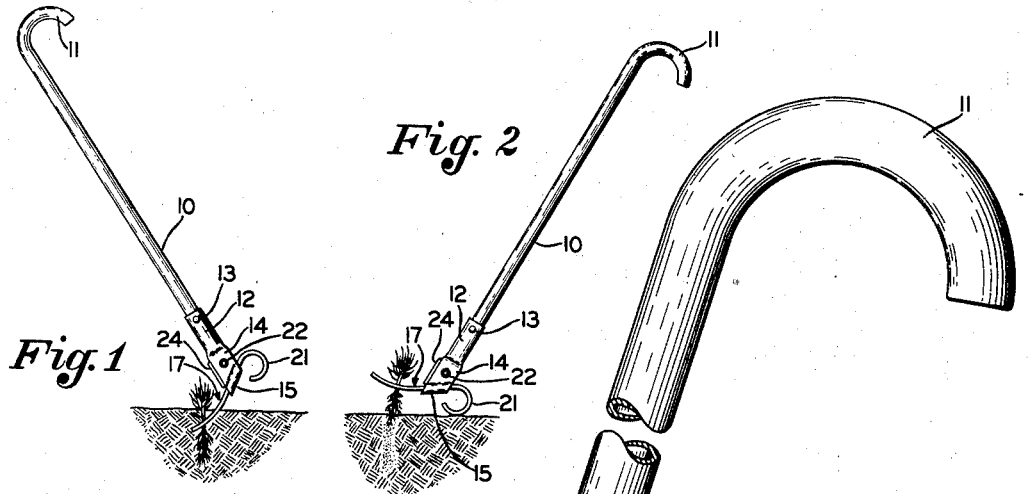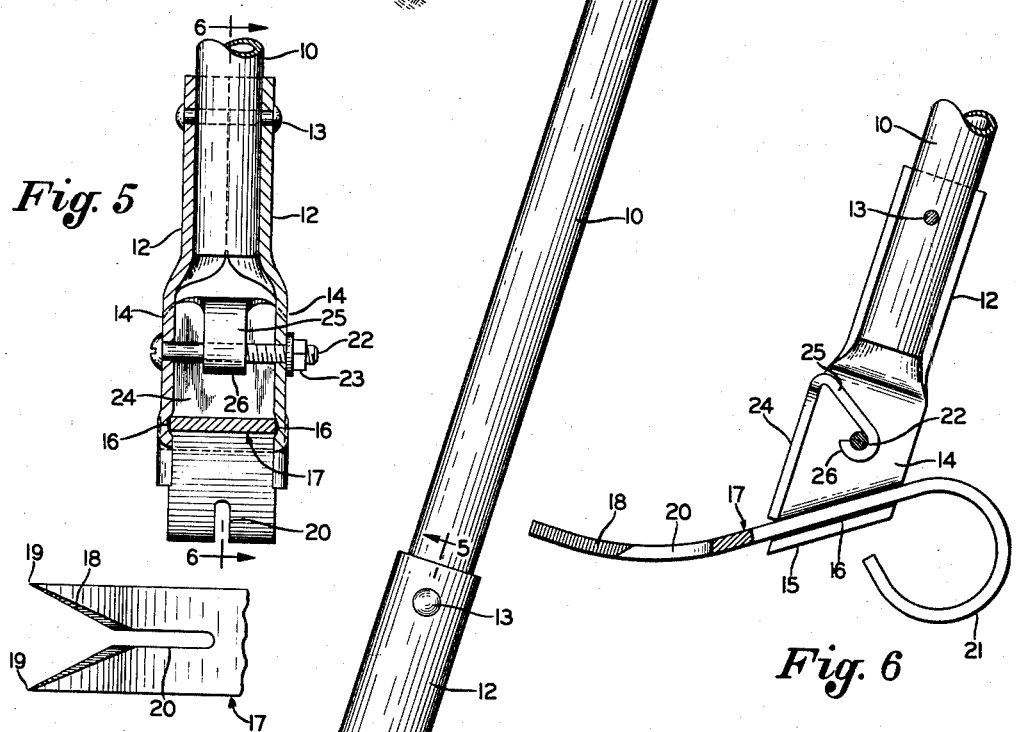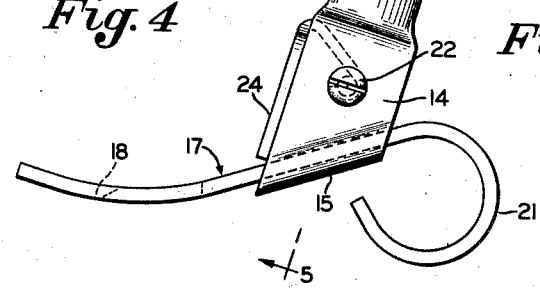

2,843,359
WEED DIGGING TOOL
Earl E. Franz and Earl E. Franz, Jr., Canton, Ohio
Application March 21, 1956, Serial No. 572,958
4 Claims. (Cl. 254—132)

The invention relates to weed diggers, and more particularly to a long-handled weed digging tool by means of which the operator may quickly and easily remove weeds from the ground while in a standing position.

It is an object of the invention to provide a weed digging tool comprising a handle portion with a forwardly disposed digging blade at its lower end and a rolled portion at the rear end of the tool providing a fulcrum upon which the blade may be tilted.

Another object is to provide such a tool, in which the blade is provided with a V-shape notch terminating inwardly in a reduced slot.

A further object is to provide a tool of this character, in which the blade and fulcrum are formed of a single metal plate attached to the lower end of the handle.

A still further object is to provide a weed digging tool of the character referred to, in which the blade is adjustably connected to the handle.

Another object of the invention is to provide such a weed digger having a blade formed of a metal plate with a V-shape notch in its forward end, the rear end of said plate being bent to cylindrical shape to provide a fulcrum adapted to rest upon the ground for tilting the blade upwardly.

A further object is to provide a tool of this character in which the blade is clamped between a pair of bracket members depending from the lower end of the handle.

The above objects together with others which will be apparent from the drawing and following description, or which may be later referred to, may be attained by constructing the improved weed digging tool in the manner hereinafter described in detail and illustrated in the accompanying drawing.

In general terms, the invention may be briefly described as comprising an elongated handle, preferably formed of a metal tube, the upper end of which is formed into a crook to provide a hand grip. A pair of substantially semi-cylindrical bracket members are riveted or otherwise permanently attached to the lower end of the handle, and each bracket member includes a flat portion depending below the handle, the lower edges thereof being forwardly and downwardly inclined and having internal grooves at their terminal edges.

The digging blade is in the form of an elongated metal plate having a V-shape notch in its forward end, terminating rearwardly in a reduced slot. The forward end of the blade is preferably curved slightly upward, and the rear end of the plate is bent downward and forward into cylindrical form, providing a fulcrum for contact with the ground.

This plate is received in the downwardly and forwardly inclined grooves in the lower ends of the bracket members, and is clamped therebetween as by a bolt located through the depending portions of the bracket member.

For the purpose of preventing the space between the depending portions of the bracket members from becoming clogged with earth, a flat metal sheet is located across the forward edges of these depending portions of the brackets, and extends substantially from the lower end of the handle to the top of the blade. An angular extension may be formed upon this flat sheet, and provided with a tubular portion receiving the clamping bolt.

In the operation of the tool for digging weeds from the ground, the operator may stand erect, and, grasping the upper end of the handle, tilt the same forward and downward to locate the blade in upright position adjacent to a weed to be removed.

By pressing his foot upon the upturned fulcrum, the blade is pushed into the ground, engaging the root of the weed in the V-shape notch of the blade at a point below the surface. The handle is then tilted rearwardly engaging the fulcrum with the ground and engaging the root of the weed in the reduced slot in the blade, and as the rearward tilting movement is continued, the weed is pulled out of the ground.

Having thus briefly described the construction and operation of the invention, reference is now made to the accompanying drawings showing a preferred embodiment of the weed digging tool, in which:

Fig. 1 is a side elevation of the tool, showing the manner in which the blade is inserted into the ground adjacent to a weed;

Fig. 2 is a similar view showing the manner in which the weed is pulled out of the ground;

Fig. 3 is an enlarged side elevation of the tool;

Fig. 4 is a fragmentary top plan view of the blade;

Fig. 5 is a longitudinal sectional view, taken on the line 5—5, Fig. 3; and

Fig. 6 is a longitudinal sectional view, taken on the line 6—6, Fig. 5.

Referring now more particularly to the construction illustrated in the drawings, in which similar numerals refer to similar parts throughout, the weed digging tool includes a handle 10, preferably in the form of a metal tube. The upper end of the handle is preferably formed into a crook 11, providing a hand grip by means of which the tool may be manipulated by an operator while standing erect.

A pair of substantially semi-cylindrical bracket members 12 are rigidly connected to the lower end of the handle 10, as by a rivet 13. Substantially flat extensions 14, on the bracket members, depend below the lower end of the handle 10.

The lower edge of each extension 14 is forwardly and downwardly inclined, as indicated at 15, and a groove 16 is formed on the inner side of each extension adjacent to the lower edge thereof.

The blade of the tool is in the form of an elongated metal plate indicated generally at 17, having a V-shape notch 18 at its forward end. The edges of this notch are preferably beveled, as shown in Fig. 4, and the open end of the notch provides the sharp points 19 at the forward end of the blade, for easily digging into the ground.

At its apex, the V-shape notch 18 communicates with the rearwardly disposed, reduced slot 20. At its rear end, the plate 17 is formed into tubular shape, as indicated at 21, providing a fulcrum for tilting the tool as will be later described.

This plate 17 is located between the depending extensions 14 of the brackets 12, opposite edges of the plate being received in the downwardly and forwardly inclined grooves 16 of the extensions. A bolt 22 is located through the extensions 14 and clamps the plate 17 therebetween in adjusted position.

It will be obvious that the plate 17 may be easily adjusted by loosening the nut 23, upon the bolt 22, and sliding the plate 17 within the grooves 16. The forward end of the plate 17 may be curved slightly upward, as shown in the drawing.

For the purpose of preventing the space between the bracket extensions 14 from becoming clogged with earth, during use of the tool, a sheet metal shield 24 is located across the front edges of the extensions 14, and extends substantially from the lower end of the handle to the top of the blade 17.

A reduced, angular extension 25 is formed at the top of the shield 24, and extends rearwardly and downwardly between the bracket extensions 14. The rear end of the extension 25 is formed into tubular or channel shape, as indicated at 26, for location around the clamping bolt 22, in order to hold the shield 24 in position.

In using the tool for digging weeds from lawns, and the like, the operator standing erect, grasps the hand grip 11 at the upper end of the handle, and inclines the handle forwardly, placing the top of the blade 17 adjacent to a weed to be removed, and then pushes down upon the blade, as by placing one foot on the cylindrical fulcrum 21, so as to insert the blade 17 into the ground in such manner as to engage the root of the weed in the V-shaped notch of the blade, as shown in Fig. 1.

By then using the cylindrical portion 21 as a fulcrum, the handle is tilted backward, raising the blade 17 out of the ground. As the blade is thus tilted upward, the root of the weed will be received in the reduced slot 20 in the blade, and is pulled out of the ground, as shown in Fig. 2, the leaves of the weed preventing the same from passing down through the slot in the blade.

It will thus be obvious that a very simple and efficient weed digging tool is provided, by means of which the operator may stand erect, and in a single, continuous operation, insert the blade into the ground adjacent to a weed and pull the weed out of the ground, without the necessity of bending or stooping down. When the weed has been pulled from the ground it may be easily removed from the tool and placed in a basket, cart or other receptacle.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

We claim:

1. A weed digging tool comprising a handle, a pair of bracket members fixed upon the lower end of the handle, substantially flat extensions depending from said brackets and having opposed grooves at their lower edges, a blade slidably located between said extensions and having its side edges located in said grooves, a clamping bolt located through said bracket extensions for clamping said blade therebetween in adjusted position, there being a notch in the forward end of said blade, and the rear end of said blade being curved downwardly, then forwardly and then upwardly forming a substantially cylindrical fulcrum.

2. A weed digging tool comprising a handle, a pair of bracket members fixed upon the lower end of the handle, substantially flat extensions depending from said brackets and having opposed grooves at their lower edges, a blade slidably located between said extensions and having its side edges located in said grooves, a clamping bolt located through said bracket extensions for clamping said blade therebetween in adjusted position, there being a V-shape notch terminating rearwardly in a reduced slot in the forward end of said blade, and the rear end of said blade being curved downwardly, then forwardly and then upwardly forming a substantially cylindrical fulcrum.

3. A weed digging tool comprising a handle, a pair of bracket members fixed upon the lower end of the handle, substantially flat extensions depending from said brackets and having opposed grooves at their lower edges, a blade slidably located between said extensions and having its side edges located in said grooves, a clamping bolt located through said bracket extensions for clamping said blade therebetween in adjusted position, there being a notch in the forward end of said blade, the rear end of said blade being curved downwardly, then forwardly and then upwardly forming a substantially cylindrical fulcrum, and a shield plate located across the front edges of said bracket extensions and extending substantially from the lower end of the handle to the top of said blade.

4. A weed digging tool comprising a handle, a pair of bracket members fixed upon the lower end of the handle, substantially flat extensions depending from said brackets and having opposed grooves at their lower edges, a blade slidably located between said extensions and having its side edges located in said grooves, a clamping bolt located through said bracket extensions for clamping said blade therebetween in adjusted position, there being a V-shape notch terminating rearwardly in a reduced slot in the forward end of said blade, the rear end of said blade being curved downwardly, then forwardly and then upwardly forming a substantially cylindrical fulcrum, and a shield plate located across the front edges of said bracket extensions and extending substantially from the lower end of the handle to the top of said blade, a rearwardly and downwardly angled extension upon the top of said shield plate, said angled extension terminating in a tubular portion located around said clamping bolt.

References Cited in the file of this patent

UNITED STATES PATENTS

| | | |
|---|---|---|
| 1,526,652 | Wilson | Feb. 17, 1925 |
| 2,121,265 | Ruffcorn | June 21, 1938 |
| 2,349,621 | Hardman | May 23, 1944 |
| 2,373,898 | Kulesh | Apr. 17, 1945 |